US011637991B2

(12) United States Patent
Pitts et al.

(10) Patent No.: US 11,637,991 B2
(45) Date of Patent: Apr. 25, 2023

(54) VIDEO CONFERENCING SYSTEMS FEATURING MULTIPLE SPATIAL INTERACTION MODES

(71) Applicant: Google LLC, Mountain View, CA (US)

(72) Inventors: Colvin Pitts, Snohomish, WA (US); Aaron Michael Donsbach, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/394,324

(22) Filed: Aug. 4, 2021

(65) Prior Publication Data

US 2023/0044865 A1   Feb. 9, 2023

(51) Int. Cl.
| H04N 7/15 | (2006.01) |
| H04N 7/14 | (2006.01) |
| H04M 3/56 | (2006.01) |
| H04L 12/18 | (2006.01) |
| H04L 9/40 | (2022.01) |

(52) U.S. Cl.
CPC ......... *H04N 7/157* (2013.01); *H04L 12/1818* (2013.01); *H04L 12/1822* (2013.01); *H04L 63/101* (2013.01); *H04M 3/568* (2013.01); *H04N 7/147* (2013.01); *H04N 7/152* (2013.01)

(58) Field of Classification Search
USPC ........................................................ 348/14.1
See application file for complete search history.

(56) References Cited

U.S. PATENT DOCUMENTS

| 7,346,654 B1 | 3/2008 | Weiss |
| 7,974,714 B2 | 7/2011 | Hoffberg |
| 8,170,193 B2 | 5/2012 | Curry et al. |
| 8,237,771 B2 | 8/2012 | Kurtz et al. |
| 8,264,519 B2 | 9/2012 | Lunde et al. |
| 8,666,047 B2 | 3/2014 | Rambo |
| 8,848,028 B2 | 9/2014 | Stedman et al. |
| 8,994,881 B2 | 3/2015 | Shyu |
| 9,064,232 B2 | 6/2015 | Laine et al. |
| 9,318,121 B2 | 4/2016 | Dacosta |
| 9,368,117 B2 | 6/2016 | Liu et al. |

(Continued)

FOREIGN PATENT DOCUMENTS

WO   WO 2008/125593   10/2008

OTHER PUBLICATIONS

Hyder et al., "Placing the Participants of a Spatial Audio Conference Call". 2010 7th IEEE Consumer Communications and Networking Conference, Jan. 9-12, 2010, Las Vegas, NV, 7 pages.

(Continued)

*Primary Examiner* — Amal S Zenati
(74) *Attorney, Agent, or Firm* — Dority & Manning, P.A.

(57) ABSTRACT

Systems and methods for multi-attendee video conferencing are described. A system can convert from huddle video conference mode to spatial video conference mode. In particular, by assigning user roles, specific users can have greater control of the video conference as compared to other users. For instance, moderators may have a greater level of control of the video conferencing system. Thus, in example implementations of the present disclosure, specific users can affect transition between two or more video conferencing modes, such as between a huddle video conference mode and a spatial video conference mode.

19 Claims, 12 Drawing Sheets

(56) References Cited

U.S. PATENT DOCUMENTS

| | | |
|---|---|---|
| 9,998,508 B2 | 6/2018 | Sun et al. |
| 10,026,452 B2 | 7/2018 | Antonellis et al. |
| 10,522,151 B2 | 12/2019 | Cartwright et al. |
| 10,819,969 B2 | 10/2020 | Ostrover et al. |
| 11,076,128 B1* | 7/2021 | Krol .................. G06T 15/04 |
| 2006/0238611 A1 | 10/2006 | Kenoyer et al. |
| 2007/0070177 A1 | 3/2007 | Christensen |
| 2008/0252637 A1 | 10/2008 | Berndt et al. |
| 2010/0169798 A1 | 7/2010 | Hyndman et al. |
| 2010/0316232 A1 | 12/2010 | Acero et al. |
| 2011/0072367 A1* | 3/2011 | Bauer ................. G06F 3/04815 715/757 |
| 2012/0216129 A1 | 8/2012 | Ng et al. |
| 2013/0227437 A1 | 8/2013 | Brody et al. |
| 2019/0344185 A1* | 11/2019 | Fargo .................. G06T 19/20 |
| 2019/0354170 A1* | 11/2019 | Rosedale ............. A63F 13/75 |
| 2020/0059561 A1* | 2/2020 | Murali ................ H04M 3/568 |
| 2020/0218428 A1 | 7/2020 | Roos |
| 2021/0058264 A1 | 2/2021 | Fahrendorff |
| 2021/0377062 A1* | 12/2021 | Stevens ............. H04L 12/1822 |

OTHER PUBLICATIONS

Nguyen et al., "MultiView: Spatially Faithful Group Video Conferencing", CHI '05: Proceedings of the SIGCHI Conference on Human Factors in Computing Systems, Apr. 2-7, 2005, Portland, Oregon, pp. 799-808.

International Search Report and Written Opinion for Application No. PCT/US2022/039458, dated Nov. 23, 2022, 22 pages.

Li et al., "Social VR: A New Medium for Remote Communication and Collaboration", Extended Abstracts of the 2021 CHI Conference on Human Factors in Computing Systems, 2021, pp. 1-6.

* cited by examiner

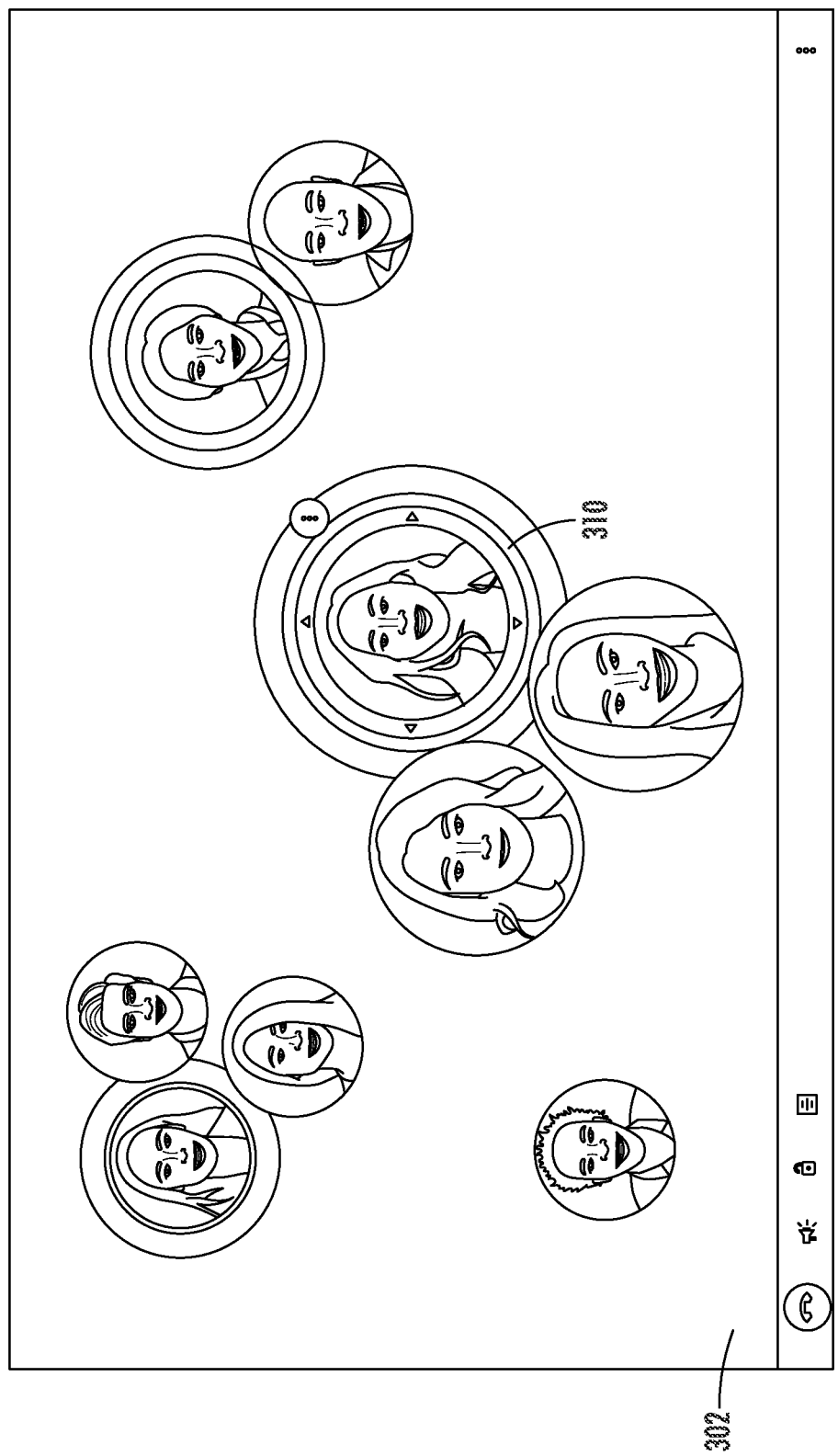

VIDEO CONFERENCING SYSTEMS FEATURING MULTIPLE SPATIAL INTERACTION MODES

FIELD

The present disclosure relates generally to video conferencing technology. More particularly, the present disclosure relates to systems and methods for videoconferencing which include or provide multiple spatial interaction modes such as different viewing and arrangement modes within a video conference having a virtual interaction space.

BACKGROUND

Multi-attendee video conferencing systems can provide audiovisual streams to a client device for multiple attendees of a video conference. Often, there are many participants that are participating in a video conference and the participants may be visualized on a display screen (e.g., visual data from other participants, presented content, shared content, etc.).

However, in existing video conference technologies, the video conferencing tool(s) are suited towards traditional meetings and lectures. For example, in certain existing video conferencing systems the audio portion of each audiovisual stream is consistently placed in the front and center of an audio soundstage associated with the video conference, and the video portion of each audiovisual stream is arranged in a layout (e.g., matrix, grid, side-by-side, etc.) with complete camera view. This representation is typically maintained regardless of the meeting type, content type, where the participant on screen may be, or the role of the participant in the conference. This traditional video conference layout does not work well for non-traditional meetings like social gatherings, small group education, collaborative sprints, networking events, or larger events.

In particular, in existing video conference layouts, participants may struggle to fully engage in the experience or purpose of a non-traditional meeting. This struggle to fully engage within a video conference can lead to misunderstanding, fatigue, interruption, inability to separate multiple speakers/audio sources, etc. Each of these drawbacks can lead to longer video conferences which can lead to an increased use of computational resources such as processor usage, memory usage, network bandwidth, etc. Further, participants may not have access to applications, software, or tools required to engage in non-traditional meetings. This can lead to participants unable to partake in social gatherings, small group education, collaborative sprints, networking events, etc. Additionally, all participants may be exposed to the same shared asset regardless of their role in the video conference.

SUMMARY

Aspects and advantages of embodiments of the present disclosure will be set forth in part in the following description, or can be learned from the description, or can be learned through practice of the embodiments.

One example aspect of the present disclosure is directed to a computing system that includes one or more processors and one or more non-transitory, computer readable media that store instructions that when executed by the one or more processors cause the computing system to perform operations. The operations include receiving a plurality of audiovisual streams respectively associated with a plurality of users. The operations include providing a video conference in a first operating mode, wherein, in the first operating mode, each of the plurality of users is enabled to freely move their respective virtual location throughout a virtual meeting space of the video conference. The operations include receiving an input from a first user of the plurality of users of the video conference that requests a transition of the video conference from the first operating mode to a second operating mode, wherein, in the second operating mode, the respective virtual location of each of the plurality of users is assigned to one of a defined set of anchor points in the virtual meeting space. The operations include in response to the input from the first user, causing the transition of the video conference from the first operating mode to the second operating mode.

Another example aspect of the present disclosure is directed to a computer-implemented method for video conferencing with multiple spatial modes. The method includes receiving, by a computing system comprising one or more computing devices, a plurality of audiovisual streams respectively associated with a plurality of users. The method includes providing, by the computing system, a video conference in a first operating mode, wherein, in the first operating mode, each of the plurality of users is enabled to freely move their respective virtual location throughout a virtual meeting space of the video conference or among a set of anchor points within the virtual meeting space. The method includes receiving, by the computing system, an input from a first user of the plurality of users of the video conference that requests a transition of the video conference from the first operating mode to a second operating mode, wherein, in the second operating mode, the respective virtual location of at least one of the plurality of users is assigned and fixed to one of the set of anchor points in the virtual meeting space. The method includes in response to the input from the first user, causing, by the computing system, the transition of the video conference from the first operating mode to the second operating mode.

Another example aspect of the present disclosure is directed to one or more non-transitory computer-readable media that store instructions that are executable by one or more processors to perform operations. The operations include receiving a plurality of audiovisual streams respectively associated with a plurality of users. The operations include providing a video conference in a first operating mode, wherein, in the first operating mode, each of the plurality of users in enabled to freely move their respective virtual location throughout a virtual meeting space of the video conference, and wherein, for a first user of the plurality of users of the video conference and in the first operating mode, a respective volume of audio playback for the respective audiovisual stream of each other user is negatively correlated with a respective distance between the virtual location of the first user and the respective virtual location of each other user within the virtual meeting space. The operations include receiving an input from the first user to move the virtual location of the first user within the virtual meeting space from a first location to a second location; and in response to the input: determining updated respective distances between the virtual location of the first user and the respective virtual location of each other user within the virtual meeting space; and dynamically changing audio playback for the respective audiovisual stream of each other user based on the updated respective distances.

Another example aspect of the present disclosure is directed to a computing system for video conferencing modes with spatial and non-spatial modes. The computing system includes one or more processors and one or more non-transitory computer-readable storage media storing instructions that are executable by the one or more processors to perform operations. The operations include receiving a plurality of audiovisual streams respectively associated with a plurality of users. The operations include providing a video conference in a huddle operating mode, wherein, in the huddle operating mode, a respective volume of audio playback for each audiovisual stream of the plurality of users is equal. The operations include receiving an input from a first user of the plurality of users of the video conference that requests a transition of the video conference from the huddle operating mode to a spatial operating mode, wherein, in the spatial operating mode, each of the plurality of users has a respective virtual location within a virtual meeting space of the video conference, and wherein, in the spatial operating mode, the respective volume of audio playback for each user is a function the respective virtual location of each user within the virtual meeting space. The operations include, in response to the input from the first user, causing the transition of the video conference from the huddle operating mode to the spatial operating mode.

Another example aspect of the present disclosure is directed to a computer-implemented method for video conferencing with spatial and non-spatial modes. The method includes receiving, by a computing system comprising one or more computing devices, a plurality of audiovisual streams respectively associated with a plurality of users. The method includes providing, by the computing system, a video conference in a huddle operating mode, wherein, in the huddle operating mode, a respective volume of audio playback for each audiovisual stream of the plurality of users is equal. The method includes receiving, by the computing system, an input from a first user of the plurality of users of the video conference that requests a transition of the video conference from the huddle operating mode to a spatial operating mode, wherein, in the spatial operating mode, each of the plurality of users has a respective virtual location within a virtual meeting space of the video conference, and wherein, in the spatial operating mode, the respective volume of audio playback for each user is a function the respective virtual location of each user within the virtual meeting space. The method includes, in response to the input from the first user, causing, by the computing system, the transition of the video conference from the huddle operating mode to the spatial operating mode.

Another example aspect of the present disclosure is directed to one or more non-transitory computer-readable media that collectively store instructions that when executed by a computing system comprising one or more computing devices cause the computing system to perform operations. The operations include receiving, by the computing system, a plurality of audiovisual streams respectively associated with a plurality of users. The operations include providing, by the computing system, a video conference in a huddle operating mode, wherein, in the huddle operating mode, a respective volume of audio playback for each audiovisual stream of the plurality of users is equal. The operations include receiving, by the computing system, an input from a first user of the plurality of users of the video conference that requests a transition of the video conference from the huddle operating mode to a spatial operating mode, wherein, in the spatial operating mode, each of the plurality of users has a respective virtual location within a virtual meeting space of the video conference, and wherein, in the spatial operating mode, the respective volume of audio playback for each user is a function the respective virtual location of each user within the virtual meeting space. The operations include, in response to the input from the first user, causing, by the computing system, the transition of the video conference from the huddle operating mode to the spatial operating mode.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3B depicts an example of a first spatial operating mode in the video conference according to example embodiments of the present disclosure.

Figure 1:
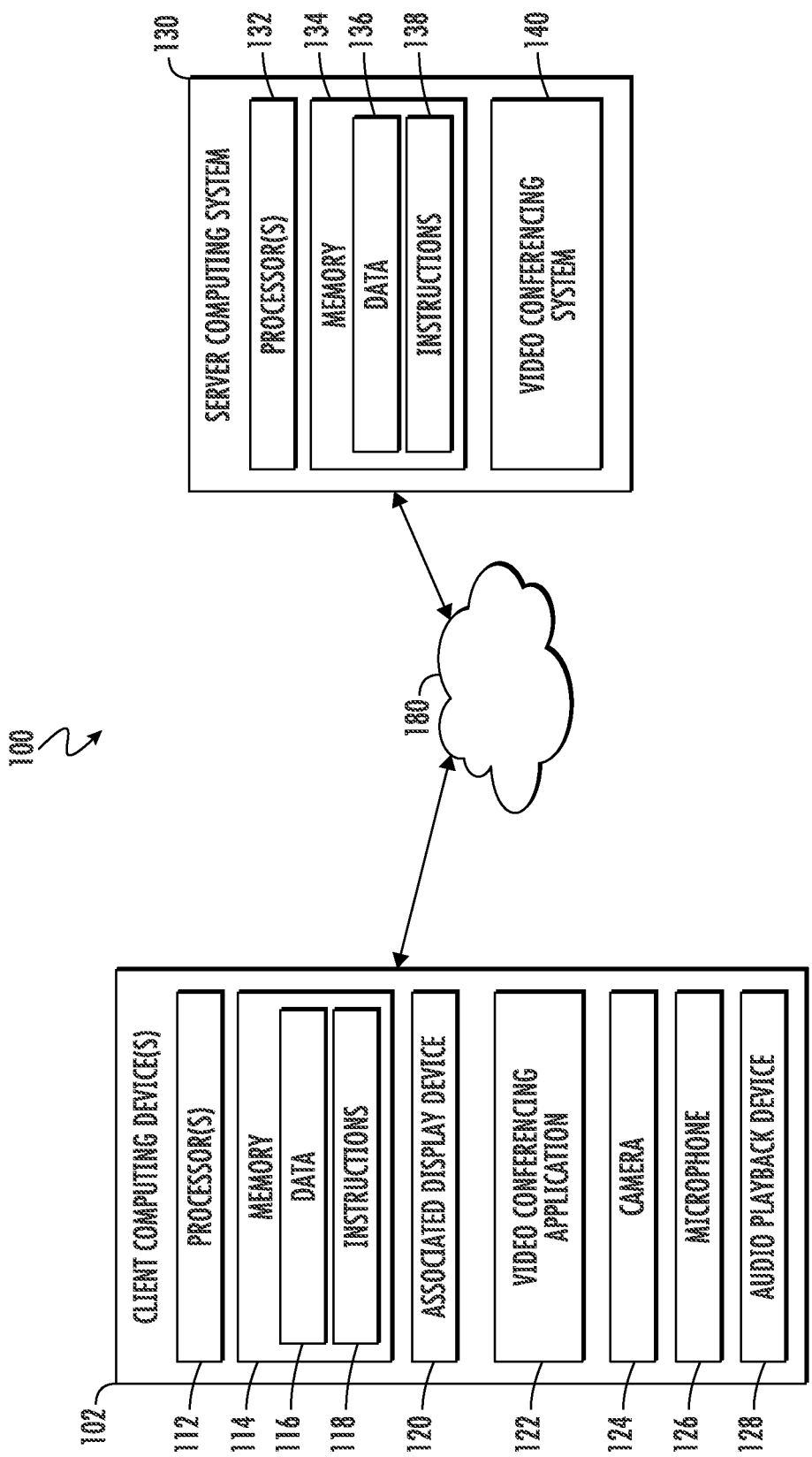
FIG. 1 depicts a block diagram of an example computing system according to example embodiments of the present disclosure.

Reference numerals that are repeated across plural figures are intended to identify the same features in various implementations.

DETAILED DESCRIPTION

Example aspects of the present disclosure are directed to systems and methods for videoconferencing which include or provide multiple spatial interaction modes such as different viewing and arrangement modes within a video conference having a virtual interaction space. For example, when operating in various forms of spatial interaction mode, a video conference can include a virtual meeting space that is two- or three-dimensional in nature. Participants in the video conference can be enabled to move within the virtual meeting space. For example, in some modes users may be able to move freely (e.g., without limitation) throughout the virtual meeting space while in other modes users are enabled to move (or request to move) between defined anchor points within the virtual space. For example, each user can move their avatar within a graphical representation of the virtual space to change their respective position within the virtual space.

According to an aspect of the present disclosure, from the perspective of a given user, the audio and/or video associated with the audiovisual streams for each other user can be modified or otherwise presented in a manner that is a function of the spatial relationship between the given user and the other users within the virtual space. For example, from the perspective of a given user, in some modes (e.g., a first spatial operating mode), the volume of audio playback for the audiovisual stream of each other user is negatively correlated with a respective distance between the virtual location of the given user and the virtual location of each other user within the virtual meeting space. Thus, users that are closer within the virtual meeting space can be louder while users that are farther away in the virtual meeting space can be softer (or muted altogether). In other examples (e.g., in a second spatial operating mode), from the perspective of a given user, the volume of audio playback for some other user can be based on whether the given user is assigned to a same anchor point as the other user in the virtual meeting space. Thus, a given user may hear audio and/or see video associated with only other users located at the same anchor point within the virtual meeting space.

Additional example aspects are also directed to techniques for mode transition between the plurality of different video conferencing modes based on input received from one or more users using the system. In particular, in some implementations, user roles may be assigned to at least some of the users. These user roles may include, for example, moderator, participant, and the like. In particular, by assigning user roles, specific users can have greater control of the video conference as compared to other users. For instance, moderators may have a greater level of control of the video conferencing system. Thus, in example implementations of the present disclosure, specific users can affect transition between two or more video conferencing modes, such as between a huddle video conference mode and a spatial video conference mode while the other users cannot affect such transition. Thus, in example implementations of the present disclosure, each of the specific users can have control over the video conference mode. Then, the input from at least one specific user can be received so the mode switches from, for example, a huddle video conference mode to a spatial video conference mode or from a spatial video conference mode to a huddle video conference mode. In such fashion, users of the video conference can participate in huddle and non-traditional meeting modes in the same video conference call.

More particularly, a video conferencing system can receive a plurality of audiovisual streams respectively associated with a plurality of participants in a video conference. Each audiovisual stream can include audio data and visual data. In some implementations, some or all of the participants may be human participants. For example, the visual data can correspond to video that depicts the human participant while the audio data can correspond to audio captured in the environment in which the human participant is located. In some implementations, some of the participants may correspond to content that is being shared among some or all of the other participants. For example, an audiovisual stream can correspond to a shared display or other shared content (e.g., shared by a specific human participant from their device or shared from a third-party source or integration). In another example, one audiovisual stream may correspond to multiple human participants (e.g., multiple humans located in a same room using one set of audiovisual equipment).

In some implementations, an audiovisual stream (e.g., a display stream shared by a participant) may include dynamic visual data while the audio data for the stream is null or blank. In other implementations, an audiovisual stream may include dynamic audio data while the visual data for the stream is null or blank (e.g., as in the case of a human participant who has their video "turned off"). Thus, as used herein, the term audiovisual stream generally refers to defined streams of content which can include audio and/or video. Multiple streams of content may originate from the same device (e.g., as in the case of a user having a first audiovisual stream for their video/audio presence and a second audiovisual stream which shares content from their device to the other participants).

In some implementations, for some or all of the audiovisual streams included in the video conference, the video conferencing system can operate within a huddle operating mode. In some implementations, the huddle operating mode can arrange the plurality of users in a matrix layout. The huddle operating mode can also provide audio playback at an equal level regardless of the position of the users in the video conference. By way of example, the huddle operating mode can display the audiovisual streams in a matrix layout. In the matrix layout, the video data of the audiovisual streams may be arranged in a table with equal rows and equal columns (e.g., 1×1, 2×2, 3×3, 4×4, etc.) and provided for display to the user.

According to an aspect of the present disclosure, for some or all of the audiovisual streams included in a video conference, the video conferencing system can provide a video conference in a first spatial operating mode. The first spatial operating mode can display the audiovisual streams in a virtual meeting space of the video conference. In the first operating mode, a user may be assigned a virtual location in the virtual meeting space of the video conference. As an example, when in the first operating mode, users may be allowed to freely move their respective virtual location throughout the virtual meeting space of the video conference. For example, users can be enabled to drag and drop or otherwise manipulate their respective avatar to the new location in the virtual meeting space. In some implementations, the first spatial operating mode can be referred to as a "recess" mode, where everyone is free to move about and create and leave conversation pods.

In some instances, a second spatial operating mode can assign each user of the video conference to one of a defined set of anchor points in the virtual meeting space. For example, each user can be randomly assigned to an anchor point or can be assigned to the anchor point that was closest to their previous position prior to transition to the second spatial operating mode. The anchor point can be a predefined space or area in the virtual meeting space. As one example, the user may be locked to an assigned anchor point in the virtual meeting space. By way of another example, the user may be able to move between anchor points. In a more particular example, the user may be able to move only between a prescribed, i.e., limited, number of anchor points.

In some implementations, the second operating mode assigns each user of the video conference to an anchor point closest to the previous position of the user. Accordingly, the user may be able to easily identify their virtual location in the virtual meeting space since it may be similar to their position in the first operating mode. In another implementation, the second operating mode may assign each user to their previous position in the virtual meeting space (e.g., the previous position of the user in the virtual meeting space if the second operating mode was previously used in the current video conference). In some implementations, certain users or groups of users may be assigned to an anchor according to a predefined assignment. For example, in an example application of the video conference technology to a virtual classroom, groups of users (e.g., students) can be assigned to each anchor according to a predefined assignment. For example, different math tracks in a class or different reading groups can be assigned to (and therefore automatically correspondingly positioned at) different anchor points corresponding to different classrooms/classes.

In some implementations, the second operating mode may contain or be organized in a "row" mode. In row mode, the plurality of users can be individually assigned to one of the set of anchor points in the virtual meeting space of the video conference. In certain instances, the audio playback may be exclusively limited to the user's current anchor point. In the row mode, the users may be able to switch anchor points with another user to change their relative virtual location. In certain instances, the user may be able to move to an available anchor point to change their relative virtual location. The administrative user may also be able to reassign users to another anchor point to change their virtual location. In another implementation, in the row mode, all users except the administrative user, can be individually assigned to one of the set of anchor points.

One example use case for the row mode is to enable an administrator (e.g., a teacher) to individually and/or selectively visit with other conference participants (e.g., students). Row mode can be used, for example, for heads-down student work. Each student can be separate from other students in order to focus on their own work. Teachers, and others with administrative permissions, may observe and interact with anyone in the room. This facilitates question answering and creates the opportunity for 1:1 interactions.

In some implementations, the second operating mode may contain or be organized in a "pod" mode. In pod mode, two or more users are assigned to at least one of the set of anchor points. The audio playback may be exclusively limited to the users' current set of assigned anchor points. In the pod mode, the users may freely move their virtual location among the set of assigned anchor points. In pod mode, the administrative user(s) may control total users contained in a pod, whether the pod is locked or unlocked for new users to join, and the virtual location of the pod in the virtual meeting space. The administrative user(s) may be able to join pods even when in the lock status. In the pod mode, the audio playback for each user is the audio associated with the pod they are currently assigned, but the user may be able to hear other pods at a reduced volume.

In some examples, pod mode can be used to facilitate small group work. For example, small groups of pupils can be assigned to pods, where they may interact with others in the pod. Teachers, and others with administrative permissions, may observe and interact with anyone in the room.

In some implementations of the pod mode, the administrative user(s) may control total users contained in a pod and the virtual location of the pod in the virtual meeting space. The administrative user(s) may be able to join pods even when in the lock status. In some implementations of the pod mode, the audio playback may be limited to the audio of the administrative user(s).

According to another aspect of the present disclosure, the pod mode may contain a sharing asset function. The sharing asset function may allow users to share assets such as a shared asset (e.g., a whiteboard, a chalkboard, a slideshows, a document, a spreadsheet, etc.) The administrative user(s) can control whether the users or pods can utilize the sharing asset function. The sharing asset function may automatically grant permissions such as an edit feature, a view feature, and an interact feature to other users in the virtual meeting space. The edit feature will allow users co-located at the set of anchor points to write or change the shared asset.

According to another aspect of the present disclosure, the video conferencing system can determine a virtual audio location for each audiovisual stream within the virtual meeting space based at least in part with the virtual location of the user and other users. The video conferencing system can modify the audio data associated with each audiovisual stream to cause playback of the audio data to have the virtual audio location within the virtual meeting space that was determined for the audiovisual stream. The video conferencing system can then provide the audiovisual streams having the modified audio data for audiovisual playback in the video conference.

In some implementations, the video conferencing system may modify the audio data associated with each audiovisual stream within the virtual meeting space. The volume of audio playback for the audiovisual stream of each user can, in some implementations, be negatively correlated with a respective distance between the virtual location of the first user and the virtual location of each other user within the virtual meeting space. In some examples, the volume of audio playback for the first user can be based on the distance of another user from the first user or whether the first user is assigned to a same anchor point as another user in the virtual meeting space.

In some implementations, the video conferencing system may not modify the audio data associated with each audiovisual stream within the virtual meeting space. The audio playback may be equal for all users and would not reflect the virtual location of the user. In one example, if the users are arranged in the matrix layout, the audio playback would be equal for all users in the video conference.

According to another aspect of the present disclosure, a user can modify their local view to be in a number of different styles. The change in their view mode can be a local change that is visible only on the user's instance. There are many possible view modes One example view mode is a neighborhood view. In this view, users are "zoomed out" and can see the entire virtual meeting space and set of participants. Another example view mode is conversation view mode. In this view, users are "zoomed in" on their own conversation. Participants and collaborative assets in the conversation are maximized, while other participants and assets may not be visible.

According to another aspect of the present disclosure, the video conferencing system in the first or second spatial operating mode may contain a minimap. The minimap can display a scaled view of the virtual meeting space. The virtual space may operate or have controls similar to a map of a digital mapping application. The minimap can enable a user to navigate through the virtual space by seeing a larger view of the space as compared to a primary zoomed-in view of the virtual space showing the specific location of the user.

According to another aspect of the present disclosure, the users in the virtual meeting space of the video conference may have a dynamic ring around the respective avatar of the user. The dynamic ring can provide information associated with a metric pertaining to the respective user. The metric may be data such as the total time the user has spoken. By way of example, the dynamic ring around the avatar of the respective user will grow or change color the more the user talks.

In some implementations, when in the spatial operating mode(s), the view of each user may transition from wide angle to face tracking. In a spatial chat, it can be advantageous to try and minimize "wasted" pixels by cropping to an area near the user's face.

According to another aspect of the present disclosure, the video conferencing system can receive an input from one of the users of the video conference that requests a transition of the video conference between different operating modes (e.g., between the huddle operating mode and/or one or more different spatial operating modes). In some examples, any user may request transition of the video conference between the first and second operating modes. In other embodiments, the user must be on a predefined access control list associated with the video conference to request transition of the video conference between the first and second operating modes. In some implementations, the access control list can be determined during the video conference. The access control list can define a set of first users enabled to cause mode transitions in the video conference. More specifically, the access control list may define the set of administrative users of the video conference. These users are preapproved to affect controls of the video conference. In certain instances, the video conferencing system can determine if the user requesting the transition is listed on the access control list. If the user requesting the transition is listed on the access control list, the video conferencing system can then cause the transition of the video conference from the first mode to the second mode in response to the request.

Thus, the video conferencing system may receive input(s) from the user(s) in the video conference. The inputs may be directed to allowing the user to switch to a plurality of different predefined anchor point arrangements, join a new pod and create a new anchor point, join an available open space, join another anchor point in the virtual meeting space, zoom-in to focus on the current virtual location, and zoom out to an expanded view of the virtual meeting space. As examples, in the second operating mode, the user may be able to freely move and join the open space in the virtual meeting space, the user can use a focus feature and zoom-out feature to change the current local view of the virtual meeting space.

The techniques described in the present disclosure (e.g., those attributed generally to a video conference system) can be performed at various different devices. As one example, the techniques described herein (e.g., switching between video conference modes) can be performed at a server computing system that is facilitating the video conference. For example, this scenario may be advantageous when video conferencing application is used for education. As another example, the techniques described herein (e.g., switching between video conference modes) can be performed at a client computing device (e.g., a device associated with one of the users). For example, this scenario may be advantageous when the meeting needs to be switched from a huddle or professional setting to a social or teamwork setting. In one example, switching the video conference to a different operation mode can be performed on a client computing device via a plug-in or other computer-readable code executed by a browser application executing a video conferencing web application. In another example, client-side operations can be performed in a dedicated video conferencing application.

The present disclosure provides a number of technical effects and benefits. As one example technical effect and benefit, the systems and methods of the present disclosure enable users to participate in non-traditional meetings. In such fashion, the users can participate in social gatherings, small group education, collaborative springs, networking events, etc. without having to switch to a different application. Improved functionality in the same video conference application can lead to users not needing to purchase or download additional software. Further, all users can work or partake as necessary within the video conference and would not be stuck to the same shared asset regardless of their role in the video conference.

As another example technical effect, the systems and methods of the present disclosure enable improved audio understanding by participants in a multi-attendee video conferencing. More particularly, the present disclosure modifies audio data from some or all of the sources (e.g., each audiovisual stream) included in the video conference so that playback of the audio data correlates to the virtual location of the user in the virtual meeting space. In such fashion, participants of the video conference can easily focus on the current virtual location and attribute the source of each audio signal included in the video conference. Improved and intuitive understanding of audio source attribution can reduce fatigue and provide a user experience that is more understandable and consistent, which may be particularly advantageous for users with visual impairments.

As another example technical effect, the systems and methods of the present disclosure also result in the conservation of computing resources. In particular, the systems and methods of the present disclosure enable participants of the video conference to identify and attribute each audio signal included in the video conference to a particular source more easily. This can reduce confusion in a video conference, which can reduce the length of the video conference as fewer misunderstandings may need to be clarified. Shorter video conferences can conserve computational resources such as processor usage, memory usage, network bandwidth, etc. Additionally, users may consume a video conference just as 'listeners', where this spatial distribution of audio based on content type, user role, and accessibility-settings may suffice to understand and follow the conference, saving bandwidth through the omission of visual data.

The techniques proposed herein may be of particular assistance to visually impaired users, who may not be able to visually determine the identity of the current speaker or audio source. Thus, as examples, by assigning virtual locations in audio space to users, visually impaired users can tell whether a user in the current set of anchors or the users in another area of the virtual meeting space was speaking and/or whether a sound belonged to a shared asset or an integrated application.

With reference now to the Figures, example embodiments of the present disclosure will be discussed in further detail.

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, a gaming console, or any other computer device that is configured such that it can allow a user to participate in a video conference. The client computing device 102 can include one or more processor(s) 112, memory 114, an associated display device 120, a video conferencing application 122, a camera 124, a microphone 126, and an audio playback device 128 (e.g., speaker(s) such as stereo speakers).

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing device 130 (e.g., one or more video conferencing applications 122, etc.). The client computing device 102 can implement the instructions to execute aspects of the present disclosure, including directing communications with server computing system 130, providing a video conferencing application 122 and/or video stream to a user, scaling a received video stream to a different resolution display region, and/or generating and sending instructions to the server computing system requesting a new video stream for a display region.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The client computing device 102 can execute a video conferencing application 122. In one example, the video conferencing application 122 is a dedicated, purpose-built video conferencing application. In another example, the video conferencing application 122 is a browser application that executes computer-readable code locally (e.g., by processor(s) 112) to provide a video conference as a web application.

The video conferencing application 122 can capture visual data from a camera 124 and/or a microphone 126 and transmit that data to the server computing system 130. The client computing device 102 can receive, from the server computing system 130, audiovisual data (e.g., audio data and/or visual data) from one or more other participants of the video conference (e.g., other client computing devices 102). The client computing device 102 can then display the received visual data to users of the client computing device 102 on associated display device 120 and/or cause playback of the received audio data to users of the client computing device 102 with the audio playback device 128. In some example embodiments, the camera 124 collects visual data from one or more users. The camera 124 can be any device capable of capturing visual data. The microphone 126 can be any device capable of capturing audio data. In one example, a webcam can serve as both a camera and a microphone.

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive audiovisual streams from a plurality of client computing devices 102 (e.g., via network 180) respectively associated with a plurality of video conference attendees. The video conferencing system 140 can provide the audiovisual streams to each of the client computing devices 102.

The video conferencing application 122 and/or the video conferencing system 140 can operate independently or collaboratively to perform any of the techniques described herein.

Figure 2:
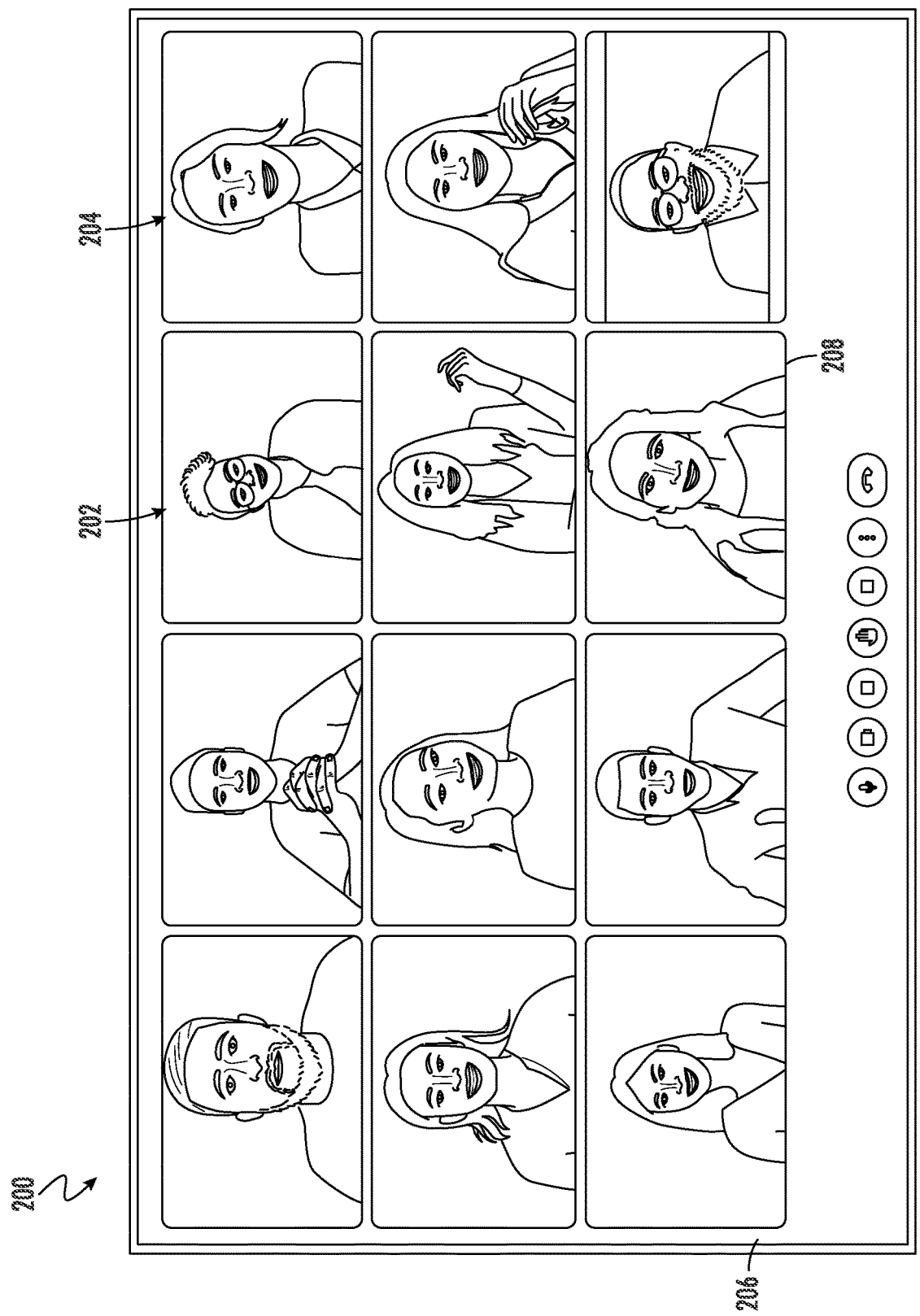
FIG. 2 depicts an example of a huddle operating mode according to example embodiments of the present disclosure.

FIG. 2 depicts an example of the huddle operating mode according to example embodiments of the present disclosure. In particular, FIG. 2 shows a base user interface 200 for a video conference application in the huddle operating mode. The user interface 200 displays visual data from a plurality of audiovisual streams respectively associated with a plurality of participants in a video conference. Each audiovisual stream can include audio data and visual data. In some implementations, some or all of the participants may be human participants. For example, the visual data can correspond to video that depicts the human participant while the audio data can correspond to audio captured in the environment in which the human participant is located. For example, regions 202 and 204 of the user interface correspond to video that depicts two different human participants of the video conference. For example, the huddle operating mode can have a matrix layout 206.

In some implementations, some of the participants (not shown) may correspond to content that is being shared among some or all of the other participants. For example, an audiovisual stream can correspond to a shared display or other shared content (e.g., shared by a specific human participant from their device or shared from a third-party source or integration). In another example, one audiovisual stream may correspond to multiple human participants (e.g., multiple humans located in a same room using one set of audiovisual equipment).

In some implementations, an audiovisual stream (e.g., a display stream shared by a participant) may include dynamic visual data while the audio data for the stream is null or blank. In other implementations, an audiovisual stream may include dynamic audio data while the visual data for the stream is null or blank (e.g., as in the case of a human participant who has their video "turned off"). Thus, as used herein, the term audiovisual stream generally refers to defined streams of content which can include audio and/or video. Multiple streams of content may originate from the same device (e.g., as in the case of a user having a first audiovisual stream for their video/audio presence and a second audiovisual stream which shares content from their device to the other participants). In some implementations, the audiovisual stream of a first user may be indicated by an icon (not shown) or a box around the visual stream of the respective user. The highlighted box or icon may indicate the user is on the access control list.

Figure 3A:
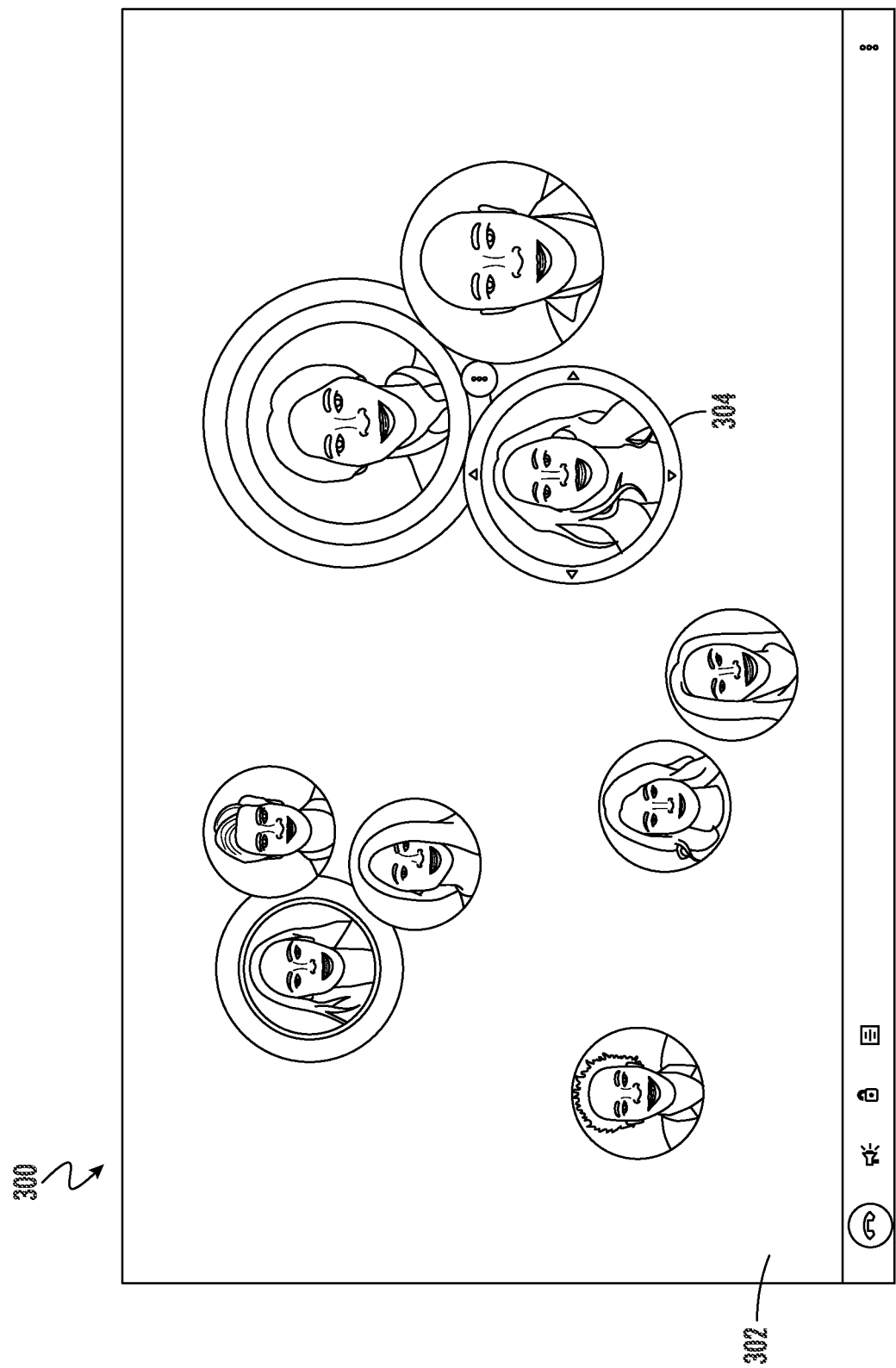
FIG. 3A depicts an example of the first spatial operating mode according to example embodiments of the present disclosure.

FIG. 3A depicts an example of the first spatial operating mode according to example embodiments of the present disclosure. In particular, FIG. 3A shows a base user interface 300 for a video conference application in the first operating mode. The user interface 300 displays visual data from a plurality of audiovisual streams respectively associated with a plurality of participants in a video conference.

In the first operating mode, the plurality of users are able to freely move about the virtual meeting space 302. For example, the user represented by avatar 304 could click and drag and drop her avatar 304 anywhere in the virtual meeting space 302. Specifically, FIGS. 3A and 3B together depict an example of movement in the first operating mode according to example embodiments of the present disclosure. In particular, FIGS. 3A and 3B shows the user 304 moving to a new virtual location in the virtual meeting space 302.

In some implementations, the volume of audio playback for the audiovisual stream of each other user may be negatively correlated with a respective distance between the virtual location of the first user and the respective virtual location of each other user within the virtual meeting space 302. The further away the other user is from the first user, the softer the audio playback of each other user. The closer the other user is to the first user, the louder the audio playback of each other user.

Figure 3C:
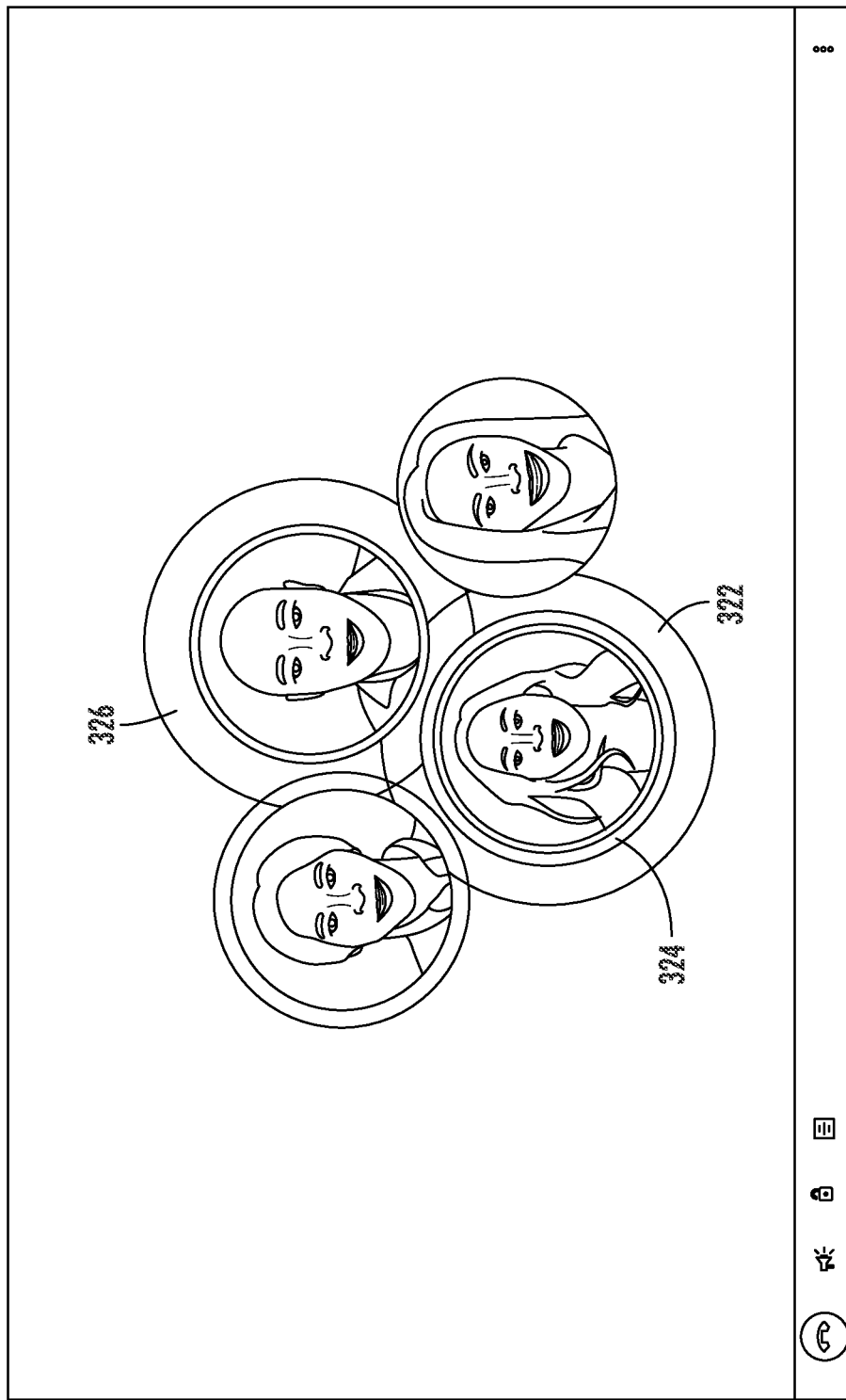
FIG. 3C depicts an example of a dynamic ring in the first operating mode according to example embodiments of the present disclosure

FIG. 3C depicts a dynamic ring in the first operating mode according to example embodiments of the present disclosure. More specifically, the dynamic ring 322 provides information. In some implementations, when the user has not spoken recently, the dynamic ring will not visibly show. When the user is talking and has talked before, the dynamic ring 322 can appear around the avatar of the user with an inner ring 324 indicating the user is currently speaking. When the user has recently spoken but is not currently speaking, the dynamic ring 322 can show, but may not have the inner ring (e.g., as shown at 326). In general, in some examples, when a user speaks the dynamic ring 322 can grow and then can decay when the user does not speak.

Figure 4A:
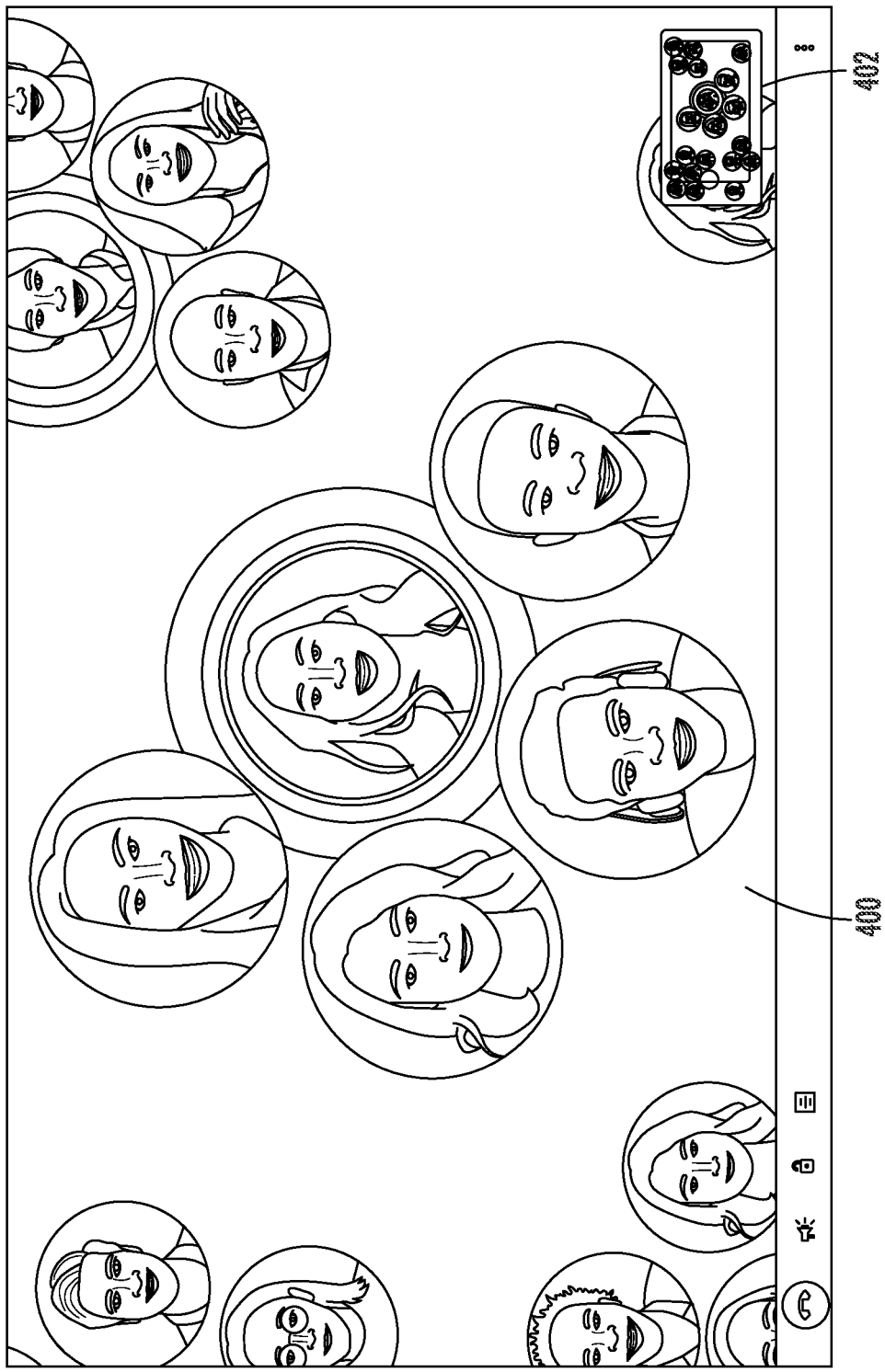
FIG. 4A depicts an example of a focus feature in the first operating mode according to example embodiments of the present disclosure.

FIG. 4A demonstrates the ability for a user to navigate within the virtual meeting space 400. For example, map-style zoom and pan controls can enable a user to zoom in and out and pan around the virtual meeting space 400. This will allow the user to locally display a reduced view of the current area of the virtual meeting space 400. Similarly, the user can zoom-out of the current view. The zoom-out feature (specific control widget not shown) may allow the user to locally display an expanded view (not shown) of the virtual meeting space. A minimap 402 can provide the user with a quick reference as to their locally displayed location within the meeting space 400. In some implementations, the minimap 402 will not display if the user uses the zoom-out feature to show the whole virtual meeting space.

Figure 4B:
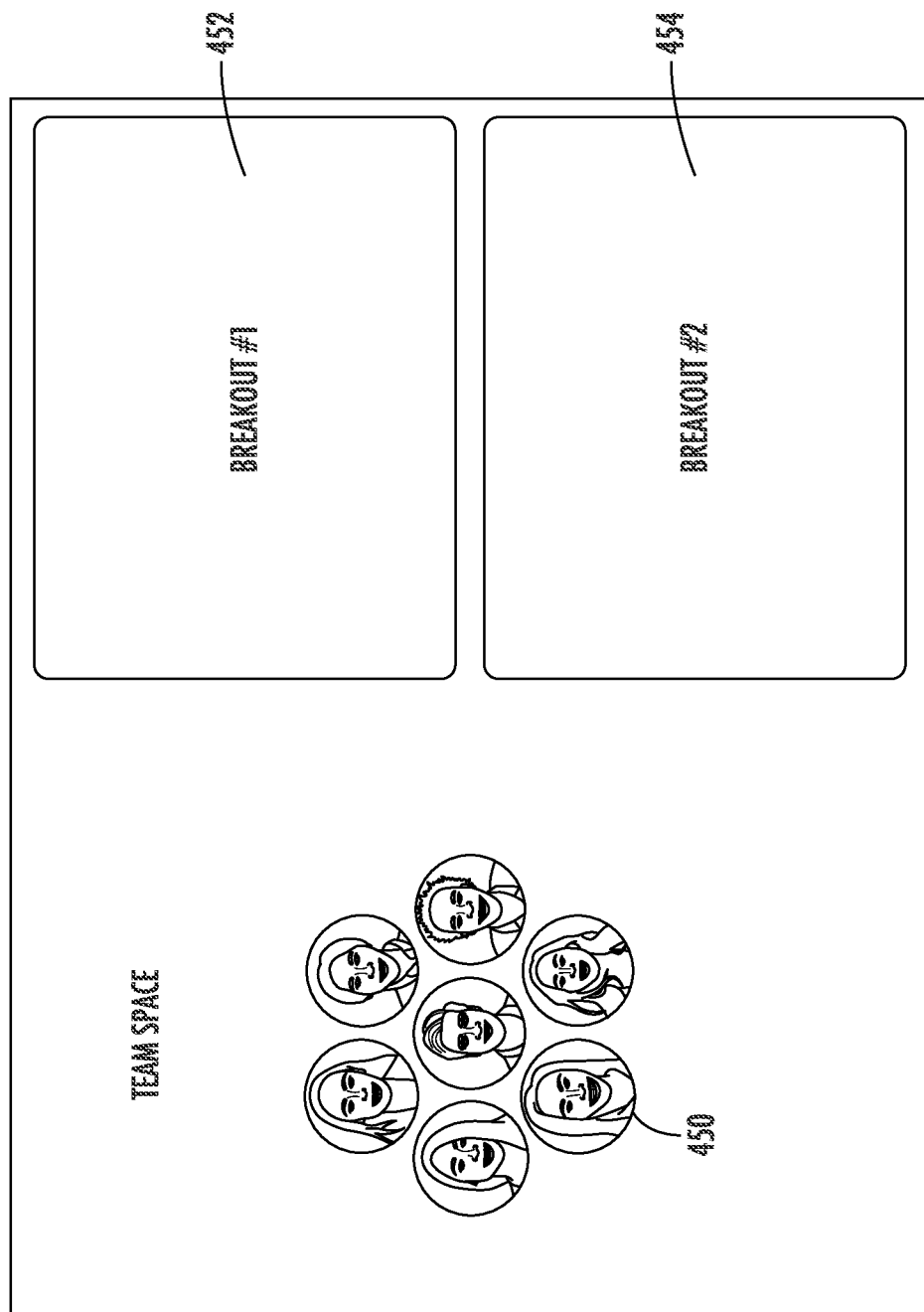
FIG. 4B depicts an example of the ability to sort participants into breakout rooms according to example embodiments of the present disclosure.

FIG. 4B depicts an example of the ability to sort participants into breakout rooms according to example embodiments of the present disclosure. For example, user avatars 450 can be sorted into a number of different breakout rooms defined within a virtual meeting space. In the illustrated example, two breakout rooms are shown as 452 and 454. Each breakout room can have its own audio and/or video. Users can switch between breakout rooms (e.g., subject to administrative controls) by moving their avatar.

Figure 5A:
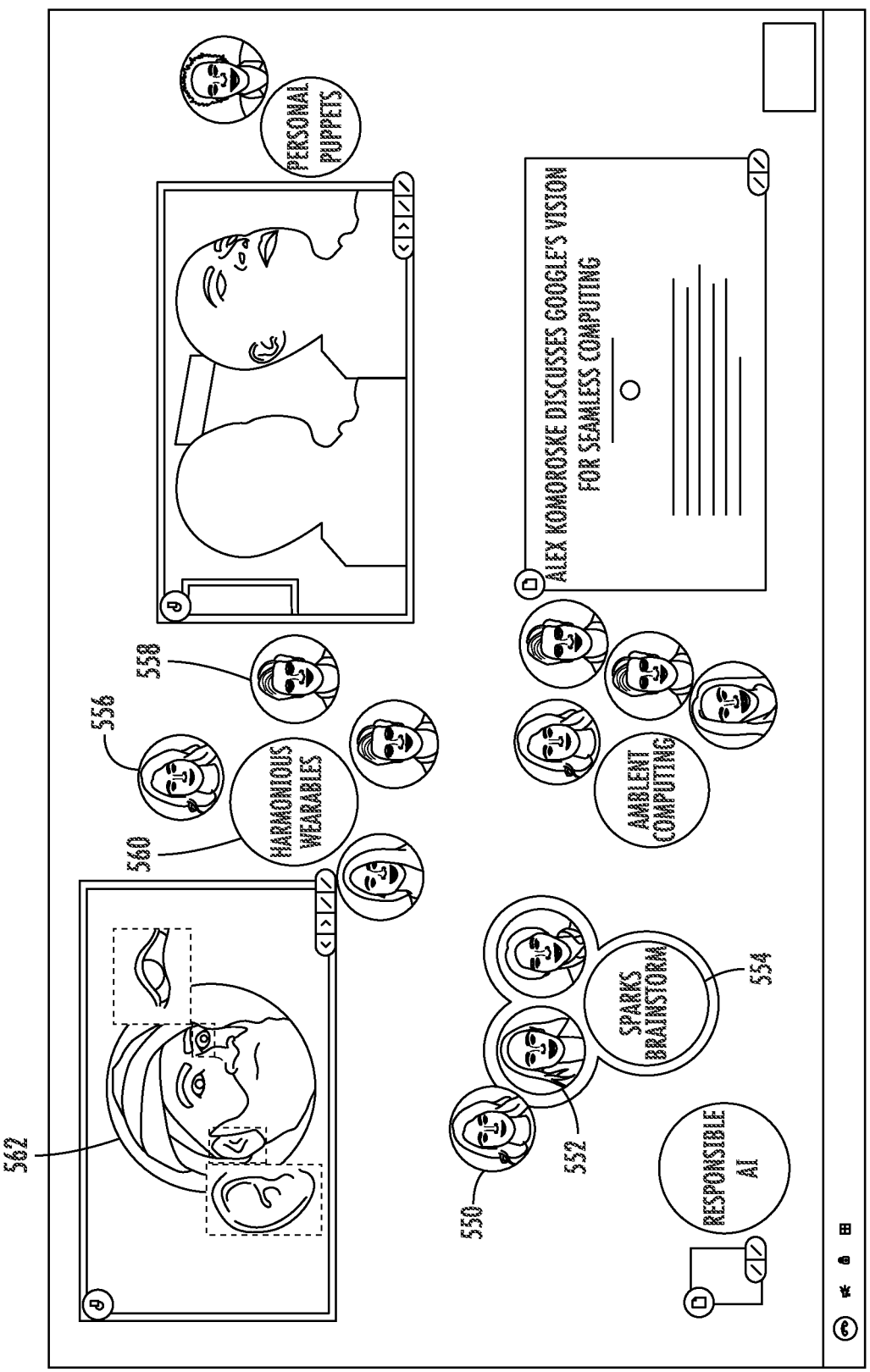
FIGS. 5A, 5B, and 5C depict example layouts of a virtual meeting space in the second operating mode according to example embodiments of the present disclosure.
Figure 5B:
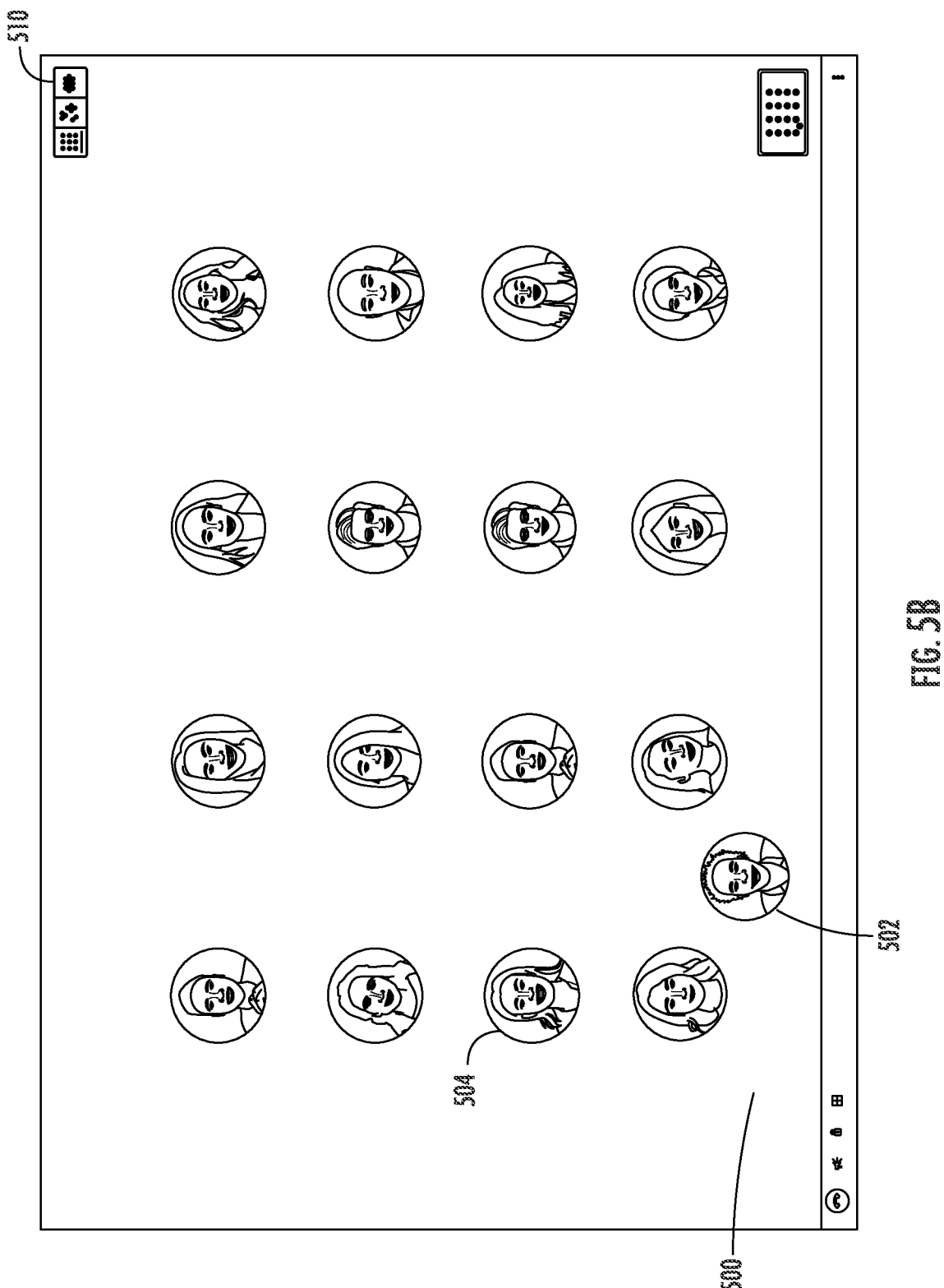
Figure 5C:
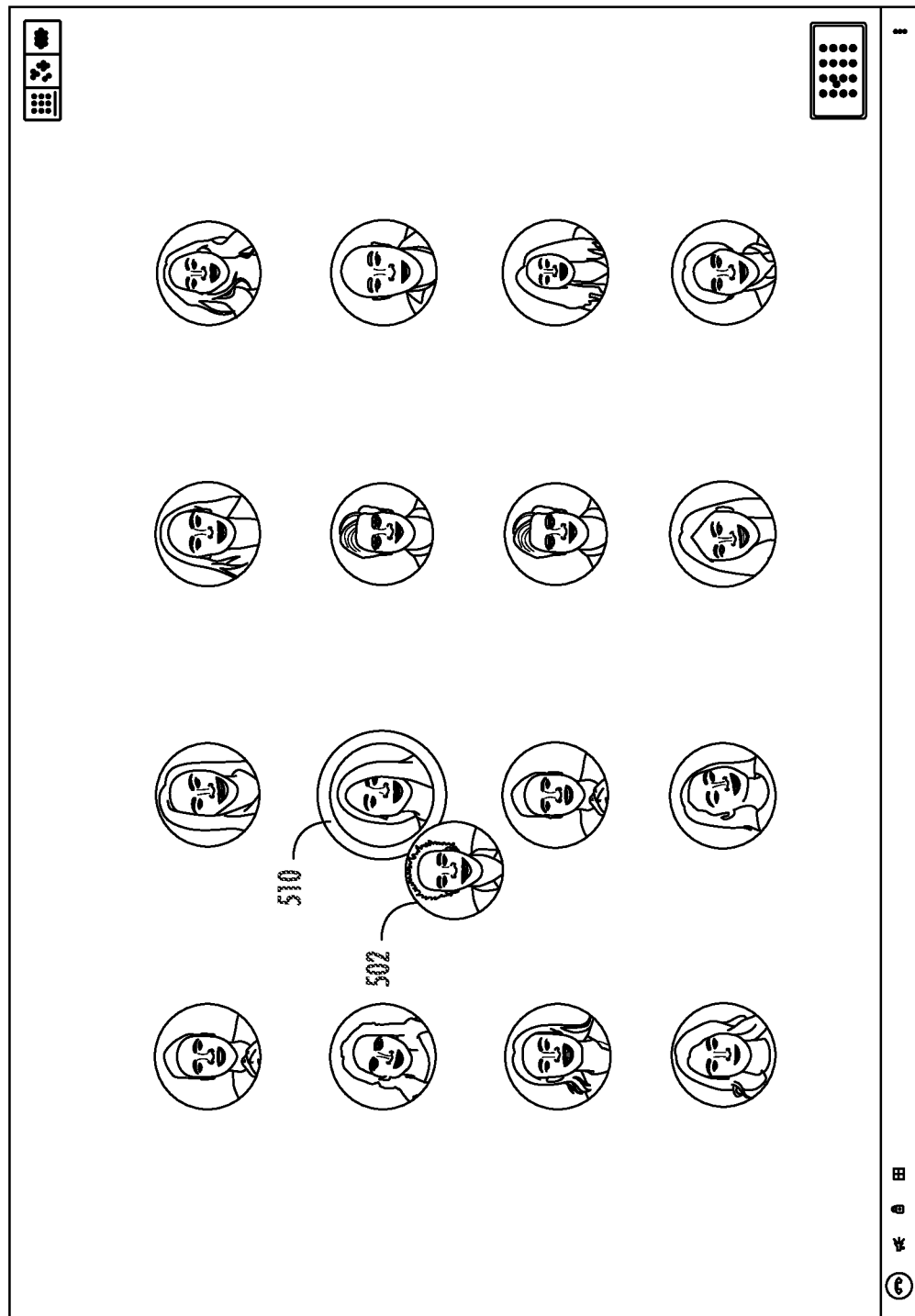

FIGS. 5A, 5B, and 5C represent a plurality of modes in the second operating mode. In some instances, the second spatial operating mode can assign each user of the video conference to one of a defined set of anchor points in the virtual meeting space. For example, each user can be randomly assigned to an anchor point or can be assigned to the anchor point that was closest to their previous position prior to transition to the second spatial operating mode. The anchor point can be a predefined space or area in the virtual meeting space. As one example, the user may be locked to an assigned anchor point in the virtual meeting space. By way of another example, the user may be able to move between anchor points. In a more particular example, the user may be able to move only between a prescribed, i.e., limited, number of anchor points.

With more specific reference to FIG. 5A, in some implementations, the second operating mode may contain or be organized in a "pod" mode. In pod mode, two or more users are assigned to at least one of the set of anchor points. For example, users 550 and 552 are assigned to the pod associated with anchor point 554 while users 556 and 558 are assigned to the pod associated with anchor point 560.

In some implementations, the audio playback may be exclusively limited to the users' current set of assigned anchor points. In the pod mode, the users may freely move their virtual location among the set of assigned anchor points. In pod mode, the administrative user(s) may control total users contained in a pod, whether the pod is locked or unlocked for new users to join, and the virtual location of the pod in the virtual meeting space. The administrative user(s) may be able to join pods even when in the lock status. In the pod mode, the audio playback for each user is the audio associated with the pod they are currently assigned, but the user may be able to hear other pods at a reduced volume.

In some examples, pod mode can be used to facilitate small group work. For example, small groups of pupils can be assigned to pods, where they may interact with others in the pod. Teachers, and others with administrative permissions, may observe and interact with anyone in the room.

According to another aspect of the present disclosure, the pod mode may contain a sharing asset function. For example, for the pod associated with anchor point 560, a document 562 is being shared among the users at the anchor point 560. The sharing asset function may allow users to share assets such as a shared asset (e.g., a whiteboard, a chalkboard, a slideshows, a document, a spreadsheet, etc.) The administrative user(s) can control whether the users or pods can utilize the sharing asset function. The sharing asset function may automatically grant permissions such as an edit feature, a view feature, and an interact feature to other users in the virtual meeting space. The edit feature will allow users co-located at the set of anchor points to write or change the shared asset.

Now with more specific reference to FIGS. 5B and 5C, in some implementations, the second operating mode may contain or be organized in a "row" mode. In row mode, the plurality of users can be individually assigned to one of the set of anchor points in the virtual meeting space of the video conference. For example, as shown in FIG. 5B, a user 504 is individually assigned to her own anchor point in virtual space 500. However, an administrator 502 may be able to move about freely in the space 500 and/or selectively visit each different anchor point. For example, as shown in FIG. 5C, the administrator 502 has joined the anchor point with user 510.

In certain instances, in the row mode, the audio playback may be exclusively limited to the user's current anchor point. In the row mode, the users may be able to switch anchor points with another user to change their relative virtual location. In certain instances, the user may be able to move to an available anchor point to change their relative virtual location. The administrative user may also be able to reassign users to another anchor point to change their virtual location. In another implementation, in the row mode, all users except the administrative user, can be individually assigned to one of the set of anchor points.

One example use case for the row mode is to enable an administrator (e.g., a teacher) to individually and/or selectively visit with other conference participants (e.g., students). Row mode can be used, for example, for heads-down student work. Each student can be separate from other students in order to focus on their own work. Teachers, and others with administrative permissions, may observe and interact with anyone in the room. This facilitates question answering and creates the opportunity for 1:1 interactions.

Figure 6:
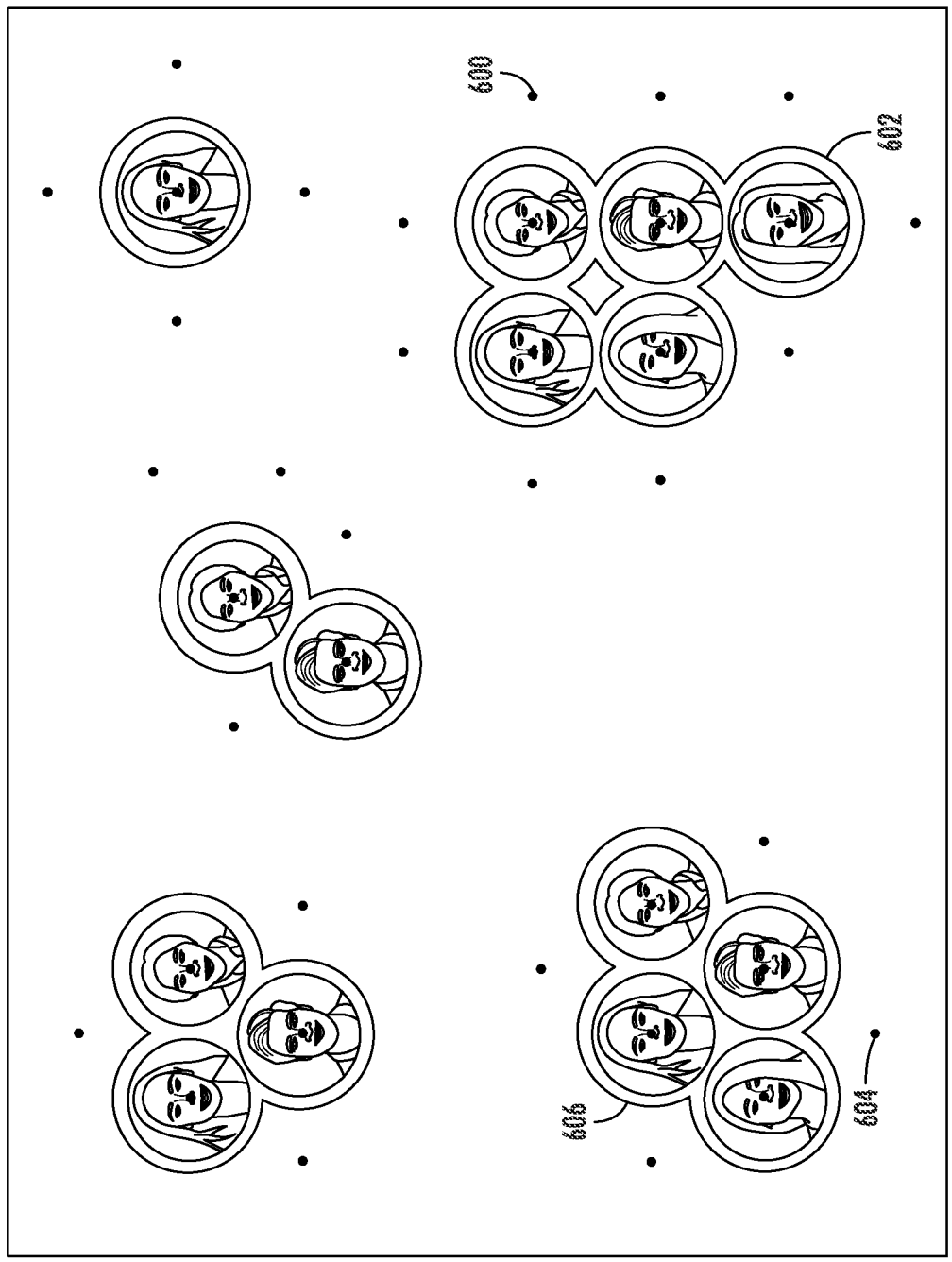
FIG. 6 depicts an example of a plurality of predefined structural modes in the second operating mode according to example embodiments of the present disclosure.

FIG. 6 depicts an example of a plurality of predefined structural modes in the video conference according to example embodiments of the present disclosure. FIG. 6 shows multiple sets of anchor points that are switchable between a plurality of predefined anchor point arrangements. The anchor point arrangements may include a grid arrangement 602 or a hive arrangement 606. In the grid arrangement 602, the grid anchor points 600 are arranged in a vertical or horizontal layout. In the hive arrangement 606, the hive anchor points 604 are arranged in a hexagonal shape.

Figure 7:
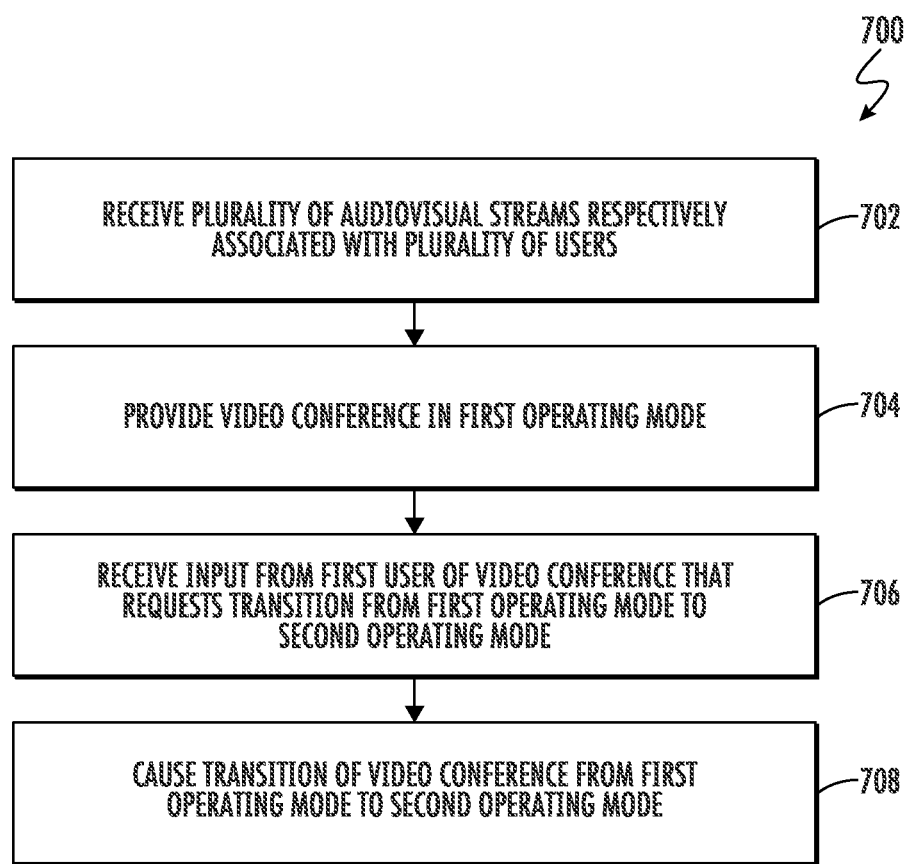
FIG. 7 depicts a flowchart depicting an example process of switching to a second operating mode in accordance with example embodiments of the present disclosure.

FIG. 7 illustrates an example process 700 of presenting audiovisual streams in a first operating mode and switching to a second operating mode in accordance with example embodiments of the present disclosure. This method is shown as sets of blocks that specify operations performed but are not necessarily limited to the order or combinations shown for performing the operations by the respective blocks. One or more portions of method 700 can be implemented by one or more computing devices such as, for example, one or more computing devices of a computing environment 100 as illustrated in FIG. 1. While in portions of the following discussion reference may be made to a particular computing environment, reference to which is made for example only. The techniques are not limited to performance by one entity or multiple entities operating on one device.

At 702, the process 700 may comprise receiving, by one or more processors, a plurality of audiovisual streams respectively associated with a plurality of users, wherein each audiovisual stream comprises audio data and visual data.

At 704, the process 700 may comprise providing, by one or more processors, providing a video conference in a first operating mode, wherein, in first operating mode, each of the plurality of users is enabled to freely move their respective virtual location throughout a virtual meeting space of the video conference.

At 706, the process 700 may comprise receiving, by one or more processors, an input from a first user of the plurality of users of the video conference that requests a transition of the video conference from the first operating mode to a second operating mode, wherein, in the second operating mode, the respective virtual location of each of the plurality of users is assigned to one of a defined set of anchor points in the virtual meeting space.

At 708, in response to the input from the first user, the one or more processors may cause the transition of the video conference from the first operating mode to the second operating mode.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for video conferencing modes with spatial and non-spatial modes, the computing system comprising:
   one or more processors; and
   one or more non-transitory computer-readable storage media storing instructions that are executable by the one or more processors to perform operations, the operations comprising:
      receiving a plurality of audiovisual streams respectively associated with a plurality of users;
      providing a video conference in a huddle operating mode, wherein, in the huddle operating mode, one or more audiovisual streams are rendered in a virtual meeting space of the video conference and a respective volume of audio playback for each audiovisual stream of the plurality of users is equal irrespective of a visual location of each user within the virtual meeting space;

receiving an input from a first user of the plurality of users of the video conference that requests a transition of the video conference from the huddle operating mode to a spatial operating mode, wherein, in the spatial operating mode, each of the plurality of users has a respective visual location within the virtual meeting space of the video conference, and wherein, in the spatial operating mode, the respective volume of audio playback for each user is a function of the respective visual location of each user within the virtual meeting space, and wherein, in the spatial operating mode, at least one of the plurality of users has a dynamic ring in a user interface, wherein the dynamic ring is configured to provide information associated with a metric pertaining to the at least one of the plurality of users; and in response to the input from the first user, causing the transition of the video conference from the huddle operating mode to the spatial operating mode.

2. The computing system of claim 1, wherein, for the first user and in the spatial operating mode, a respective volume of audio playback for the respective audiovisual stream of each other user is negatively correlated with a respective distance between a virtual location of the first user and the respective virtual location of each other user within the virtual meeting space.

3. The computing system of claim 1, wherein, for the first user and in the spatial operating mode, a respective volume of audio playback for the respective audiovisual stream associated with each other user is a function of whether the respective virtual location of each other user is assigned to a same or different anchor point as the virtual location of the first user.

4. The computing system of claim 1, wherein:
providing the video conference in the huddle operating mode comprises providing an arranging of the plurality of users in a matrix layout within a user interface;
in the spatial operating mode, the respective virtual location of each of the plurality of users is assigned to one of a defined set of anchor points in the virtual meeting space; and
the transition of the video conference from the huddle operating mode to the spatial operating mode comprises assigning each of the plurality of users to the anchor point that is closest to their respective position within the matrix layout within the user interface.

5. The computing system of claim 1, wherein the operations further comprise:
in response to the input from the first user that requests the transition of the video conference from the huddle operating mode to the spatial operating mode, determining whether the first user is on an access control list associated with the video conference, wherein the access control list defines a set of administrative users enabled to cause mode transitions in the video conference.

6. The computing system of claim 1, wherein, for the first user and in the spatial operating mode, a respective visual representation for the respective audiovisual stream of the first user comprises a cropped portion of a visual stream of the respective audiovisual stream of the first user.

7. The computing system of claim 1, wherein the spatial operating model comprises a pod mode in which two or more of the plurality of users are assigned to at least one of a set of anchor points.

8. The computing system of claim 7, wherein, in the pod mode, each of the plurality of users is enabled to freely move their respective virtual location among the set of anchor points.

9. The computing system of claim 7, wherein, in the pod mode, audio playback for each user is exclusively limited to audio associated with a user's current anchor point.

10. The computing system of claim 7, wherein, in the pod mode, audio playback for each user comprises audio associated with a current anchor point of a user at a first audio volume and audio associated with one or more other anchor point at a second, reduced volume.

11. The computing system of claim 1, wherein during the spatial operating mode, the instructions are further executable by the one or more processors to perform at least one operation, the operation comprising one or more of the following:
receiving a second input from the first user to switch to a different anchor point;
receiving a third input from the first user to join one or more users to create a new anchor point; and
receiving a fourth input from the first user to join an available open space in the virtual meeting space.

12. The computing system of claim 1, wherein the spatial operating mode further comprises a minimap of the virtual meeting space, wherein the minimap displays a scaled view of the virtual meeting space.

13. The computing system of claim 1, wherein the spatial operating mode is displayed to the first user in at least one of:
a neighborhood view comprising a zoomed-out view of the virtual meeting space for the first user; and
a conversation view comprising a zoomed-in view of the virtual meeting space for the first user.

14. The computing system of claim 1, wherein at least the spatial operating mode comprises a sharing assets function comprising sharing at least one of a view feature, an edit feature, and an interact feature between users co-located at one of a set of anchor points within the virtual meeting space.

15. A computer-implemented method for video conferencing with spatial and non-spatial modes, the method comprising:
receiving, by a computing system comprising one or more computing devices, a plurality of audiovisual streams respectively associated with a plurality of users;
providing, by the computing system, a video conference in a huddle operating mode, wherein, in the huddle operating mode, one or more audiovisual streams are rendered in a virtual meeting space of the video conference and a respective volume of audio playback for each audiovisual stream of the plurality of users is equal irrespective of a visual location of each user within the virtual meeting space;
receiving, by the computing system, an input from a first user of the plurality of users of the video conference that requests a transition of the video conference from the huddle operating mode to a spatial operating mode, wherein, in the spatial operating mode, each of the plurality of users has a respective visual location within the virtual meeting space of the video conference, and wherein, in the spatial operating mode, the respective volume of audio playback for each user is a function the respective visual location of each user within the virtual meeting space, and wherein, in the spatial operating mode, at least one of the plurality of users has a dynamic ring in a user interface, wherein the dynamic ring is configured to provide information associated with a metric pertaining to the at least one of the plurality of users; and in response to the input from the first user, causing, by the computing system, the transition of the video conference from the huddle operating mode to the spatial operating mode.

16. The computer-implemented method of claim 15, wherein, for the first user and in the spatial operating mode, a respective volume of audio playback for the respective audiovisual stream of each other user is negatively correlated with a respective distance between a virtual location of the first user and the respective virtual location of each other user within the virtual meeting space.

17. The computer-implemented method of claim 15, wherein, for the first user and in the spatial operating mode, a respective volume of audio playback for the respective audiovisual stream associated with each other user is a function of whether the respective virtual location of each other user is assigned to a same or different anchor point as the virtual location of the first user.

18. The computer-implemented method of claim 15, wherein:
providing, by the computing system, the video conference in the huddle operating mode comprises providing, by the computing system, an arranging of the plurality of users in a matrix layout within a user interface;
in the spatial operating mode, the respective virtual location of each of the plurality of users is assigned to one of a defined set of anchor points in the virtual meeting space; and
the transition of the video conference from the huddle operating mode to the spatial operating mode comprises assigning each of the plurality of users to the anchor point that is closest to their respective position within the matrix layout within the user interface.

19. One or more non-transitory computer-readable media that collectively store instructions that when executed by a computing system comprising one or more computing devices cause the computing system to perform operations, the operations comprising:
receiving, by the computing system, a plurality of audiovisual streams respectively associated with a plurality of users;
providing, by the computing system, a video conference in a huddle operating mode, wherein, in the huddle operating mode, one or more audiovisual streams are rendered in a virtual meeting space of the video conference and a respective volume of audio playback for each audiovisual stream of the plurality of users is equal irrespective of a visual location of each user within the virtual meeting space;
receiving, by the computing system, an input from a first user of the plurality of users of the video conference that requests a transition of the video conference from the huddle operating mode to a spatial operating mode, wherein, in the spatial operating mode, each of the plurality of users has a respective visual location within the virtual meeting space of the video conference, and wherein, in the spatial operating mode, the respective volume of audio playback for each user is a function the respective visual location of each user within the virtual meeting space, and wherein, in the spatial operating mode, at least one of the plurality of users has a dynamic ring in a user interface, wherein the dynamic ring is configured to provide information associated with a metric pertaining to the at least one of the plurality of users; and
in response to the input from the first user, causing, by the computing system, the transition of the video conference from the huddle operating mode to the spatial operating mode.

\* \* \* \* \*